UNITED STATES PATENT OFFICE.

BYRON B. GOLDSMITH, OF NEW YORK, N. Y.

THERMOPLASTIC KERATIN COMPOSITION.

No. 922,692.       Specification of Letters Patent.       Patented May 25, 1909.

Application filed October 7, 1907. Serial No. 396,194.

To all whom it may concern:

Be it known that I, BYRON B. GOLDSMITH, a citizen of the United States, residing in the borough of Manhattan, city, county, and State of New York, have invented a certain new and useful Improvement in Thermoplastic Keratin Composition, of which the following is a specification.

This invention relates to an improved thermoplastic compound formed from treatment of keratin (the principal albuminoid of horn, hair, wool, etc.) as well as its derivatives and compounds.

In my U. S. Patent Number 840,931, dated January 8th, 1907, I have described a process whereby a thermoplastic compound may be made from casein or its derivatives, as a convenient and cheap substitute for celluloid, rubber and the like; and I made it clear in said patent that the term "thermoplastic" was meant to describe those masses which, while reasonably hard at ordinary temperatures, are rendered soft by heat, so as to permit the uniting of separate masses, and the molding of any mass to any desired shape.

My present invention is based upon the discovery that the results obtained by the method described in said patent as applied to casein can also be reached by a similar treatment of keratin and its derivatives and compounds. Keratin is derived by methods well known to chemists principally from horn and horn-like animal products, and may also be procured from hair, wool and feathers.

Shortly stated, my invention involves the modification of the properties of keratin and substances largely composed thereof, as well as its derivatives and compounds by uniting them with converting agents under conditions of heat and pressure, for the production of a thermoplastic composition of matter, useful in the manufacture of molded articles of many kinds, and supplying a cheap and superior substitute for celluloid, rubber etc.

The term "converting agent" as used in my present specification and claims covers any substances which, when combined or admixed with keratin, its derivative or compound, acts when heated, to soften the same, but whose softening action is suspended or materially diminished upon lowering the temperature of the same.

Among the converting agents which I have found useful are alphanaphthol, betanaphthol, benzoid acid, carbolic acid, hydrochinon, kresol, pyrocatechin, resorcin, salicilic acid, urea, benzoic acid, phthalic acid, phloroglucin, pyrogallol, paratoluidin, naphthylamin, benzidin, oxy-naphthoic acid, anilin, toluidin and xyloidin. It is to be understood however that I do not limit myself to these, but that my invention covers the use of equivalents of these substances and has the scope heretofore explained.

The mode of action of these converting agents is not altogether clear. In some cases it is probably due to partial solution of the keratin when heated, but I do not confine myself to any theory of action; nor is it essential to my invention whether or not there is a chemical combination between the keratin and the converting agent.

One characteristic of a "converting agent" is its capacity to remain in the mass and not be volatilized to a material extent when moderate heat is applied. I have discovered that the best results are obtained by the use of solid reagents, such as alpha or beta naphthol and I have claimed this variant of my process and product specifically herein. Where flexibility is desired in the product, however, I have discovered that a liquid converting agent or liquids not antagonistic to the mixture may be combined with a solid agent to great advantage.

The properties of the thermoplastic compound in the cold state will vary with the particular converting agent employed and with the proportions used. Thus a great variety of characteristics are obtainable by suitable variations in proportions and qualities.

In the manufacture of my present composition the keratin or its derivatives undergoes the same treatment as is described in my aforesaid patent in connection with casein; that is to say that they may be united with the converting agent on or between suitably heated rolls. Any other method may be used whereby these substances are brought into intimate contact. Instead of using the converting agents in their natural state, they may be first dissolved in alcohol, water, or other suitable liquid which is afterward driven off by heat.

One of the practicable proportions which I have used is the following: Take a quantity of keratin, which would weigh four pounds if dried and sprinkle the same with one pound of beta-naphthol dissolved in alcohol. This is then well mixed, preferably on suitably heated rolls, and, when the mixture is completed, the mass is removed and is soft while hot but hardens on cooling.

Instead of extracting the keratin from substances containing it, I can often use those substances themselves. For instance, I can use powdered horn. In such a case a higher heat will be required in molding than where the isolated keratin is dealt with. The expression "keratin or its equivalent" is intended to cover these keratin-containing substances among others.

Certain converting agents are better adapted to be used with some keratin derivatives and compounds than with others, and in many cases the derivatives of keratin or its compounds, or combinations of two or more derivatives or compounds, give results superior to those obtained from use of the unchanged keratin.

Scraps of substances of various nature may be mixed in with the masses formed by my process, in considerable quantities. Among these are celluloid scraps, finely divided albuminoids, bits of horn, rubber, resins, gums and coloring matter. Compounding substances or fillers can also be incorporated without departing from this invention.

I have discovered that the best results are obtained by the use of solid reagents, such as alpha and beta naphthol, and I have claimed this variant of my process and product specifically herein. Where flexibility is desired in the product, however, I have discovered that a liquid converting agent or liquids not antagonistic to the mixture may be combined with a solid agent to great advantage.

I have found that, in order to produce the best results, the converting agent or agents employed should be "non-hygroscopic", by which I mean that they should not have the property of extracting moisture from the atmosphere. For this reason I have made specific claims for the use of non-hygroscopic converting agents. All of the agents which I have named above belong to this class.

What I claim is—

1. The process of making a thermoplastic composition of matter which consists in intimately mixing keratin with a converting agent, substantially as described.

2. The process of making a thermoplastic composition of matter which consists in intimately mixing keratin and a converting agent and then heating and pressing the combined ingredients substantially as described.

3. The process of producing a thermoplastic composition of matter which consists in intimately mixing beta-naphthol with keratin and subjecting the combined ingredients to heat and pressure, substantially as described.

4. The process of producing a thermoplastic composition of matter which consists in intimately mixing keratin with beta-naphthol, substantially as described.

5. The process of making a composition of matter which consists in intimately mixing keratin with an agent or agents which render the same thermoplastic, substantially as described.

6. The process of making a thermoplastic composition of matter which consists in intimately mixing keratin with a normally solid converting agent, substantially as described.

7. The process of making a thermoplastic composition of matter which consists in uniting keratin with a normally solid converting agent and subjecting the mass to heat and pressure, substantially as described.

8. The process of making a thermoplastic composition of matter which consists in intimately mixing keratin with a non-hygroscopic converting agent substantially as described.

9. The process of making a thermoplastic composition of matter which consists in uniting keratin with a normally solid non-hygroscopic converting agent with heat and pressure, substantially as described.

10. The process of making a thermoplastic composition of matter which consists in uniting keratin with a normally solid non-hygroscopic converting agent and then subjecting the mass to heat and pressure, substantially as described.

11. The process of making a relatively pliable thermoplastic composition of matter which consists in uniting keratin with a normally solid converting agent and a normally liquid converting agent, and subjecting the mass to heat and pressure, substantially as described.

12. The process of making a relatively pliable thermoplastic composition of matter which consists in uniting keratin with a normally solid converting agent and a liquid not antagonistic to the mixture, and subjecting the mass to heat and pressure, substantially as described.

13. A composition of matter consisting of a thermoplastic keratin, substantially as described.

14. A composition of matter consisting of keratin or its equivalent united with a beta-naphthol, substantially as described.

15. A composition of matter consisting of keratin and a converting agent, substantially as described.

16. A composition of matter consisting of keratin or its equivalent and beta-naphthol, substantially as described.

17. A composition of matter consisting of keratin and a normally solid converting agent, substantially as described.

18. A composition of matter consisting of keratin and a non-hygroscopic converting agent, substantially as described.

BYRON B. GOLDSMITH.

Witnesses:
H. S. MACKAYE,
M. A. BUTLER.